United States Patent
Järvinen et al.

(10) Patent No.: US 10,694,684 B2
(45) Date of Patent: Jun. 30, 2020

(54) APPARATUS FOR THE GROWING OF PLANTS AND A GROWING DEVICE

(75) Inventors: Niko Järvinen, Jyväskylä (FI); Aki Soudunsaari, Jyväskylä (FI)

(73) Assignee: NaturVention Oy, Jyväskylä (FI)

( * ) Notice: Subject to any disclaimer, the term of this patent is extended or adjusted under 35 U.S.C. 154(b) by 721 days.

(21) Appl. No.: 14/160,594

(22) PCT Filed: Jul. 20, 2012

(86) PCT No.: PCT/FI2012/050745
§ 371 (c)(1),
(2), (4) Date: May 20, 2014

(87) PCT Pub. No.: WO2013/014337
PCT Pub. Date: Jan. 31, 2013

(65) Prior Publication Data
US 2014/0318011 A1    Oct. 30, 2014

(30) Foreign Application Priority Data
Jul. 22, 2011  (FI) ................... 20110247

(51) Int. Cl.
*A01G 9/24* (2006.01)
*A01G 9/02* (2018.01)

(52) U.S. Cl.
CPC .......... *A01G 9/247* (2013.01); *A01G 9/02* (2013.01); *A01G 9/025* (2013.01); *A01G 9/241* (2013.01); *Y02P 60/244* (2015.11)

(58) Field of Classification Search
CPC .......... A01G 9/247; A01G 9/02; A01G 9/022; A01G 9/025; A01G 9/241; A01G 9/24; A01G 27/00; A01G 27/02; Y02P 60/244
See application file for complete search history.

(56) References Cited

U.S. PATENT DOCUMENTS

| | | |
|---|---|---|
| 780,627 A | 1/1905 | Umbehend |
| D237,898 S | 12/1975 | Austin |
| 4,059,922 A | 11/1977 | Digiacinto |
| D247,165 S | 2/1978 | Hart |
| D251,718 S | 5/1979 | Hart |

(Continued)

FOREIGN PATENT DOCUMENTS

| | | |
|---|---|---|
| CN | 201131194 Y | 10/2008 |
| CN | 201222896 Y | 4/2009 |

(Continued)

OTHER PUBLICATIONS

Machine translation of KR 100771486 to Irevo, dated Sep. 24, 2007 (foreign patent document cited on Sep. 14, 2015 IDS).*

*Primary Examiner* — Kathleen I Alker
(74) *Attorney, Agent, or Firm* — Laine IP Oy

(57) ABSTRACT

The invention relates to an apparatus for the growing of plants, which includes a frame, to which plants can be set to grow in a substrate, irrigation means fitted to the frame, for irrigating the substrate with an irrigation liquid, and means fitted to the frame for creating an airflow through the substrate. At least some of the plants together with their substrates are placed in modular growing units and places are arranged in the frame for the growing units, into which they can be detachably installed, independently of the irrigation means. In addition, the invention also relates to a growing device.

15 Claims, 6 Drawing Sheets

(56) References Cited

U.S. PATENT DOCUMENTS

Figure 1:
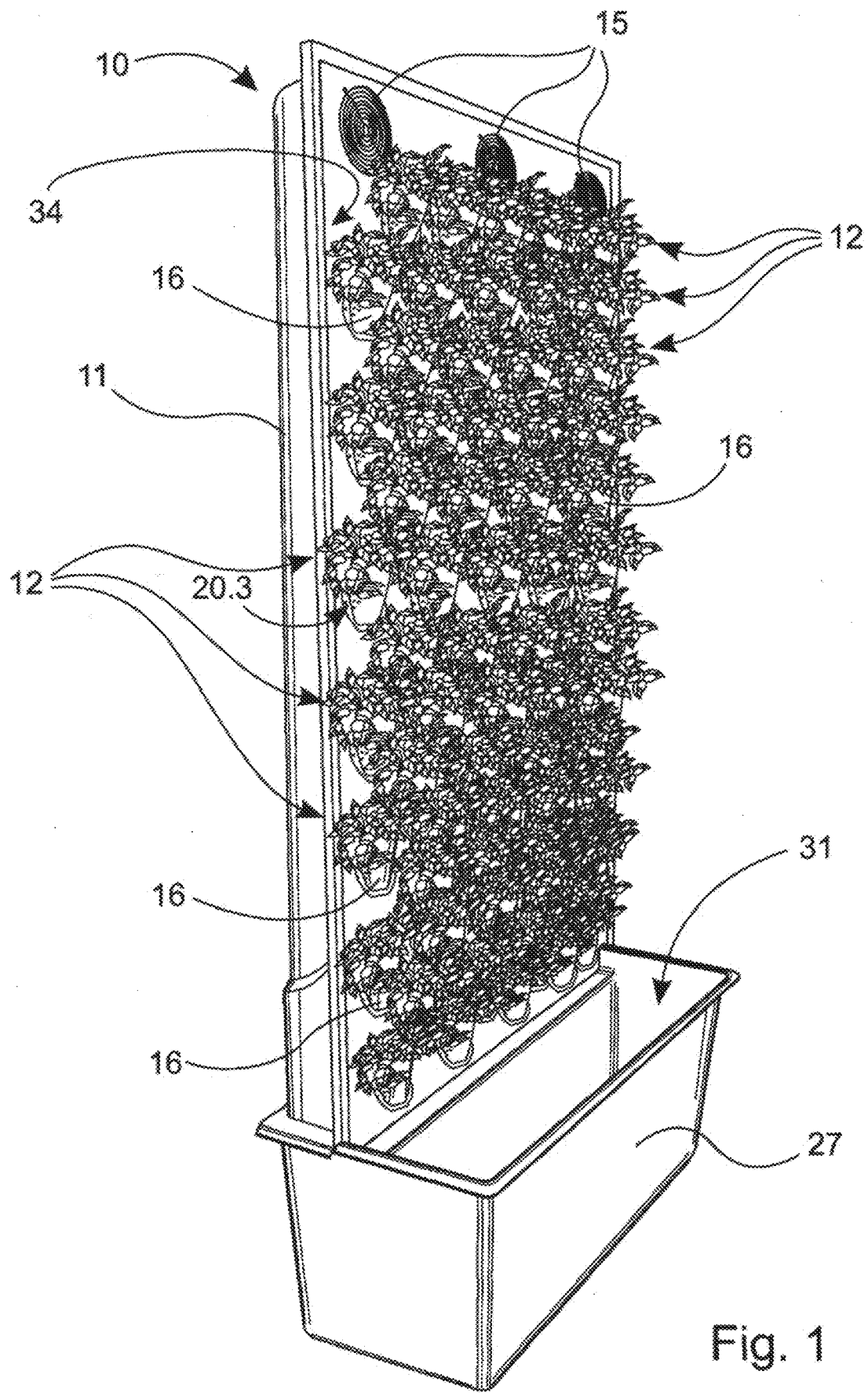

| | | |
|---|---|---|
| 4,218,847 A | 8/1980 | Leroux |
| 4,255,896 A | 3/1981 | Carl |
| D262,274 S | 12/1981 | Lahr |
| 4,415,450 A | 11/1983 | Wolverton |
| 4,756,120 A | 7/1988 | Ariedge |
| 4,869,019 A | 9/1989 | Ehrlich |
| 4,959,084 A | 9/1990 | Wolverton et al. |
| 4,976,064 A | 12/1990 | Julien |
| 5,137,625 A | 8/1992 | Wolverton |
| 5,217,696 A | 6/1993 | Wolverton et al. |
| 5,269,094 A | 12/1993 | Wolverton et al. |
| 5,276,997 A | 1/1994 | Swearengin et al. |
| 5,277,877 A | 1/1994 | Jeffrey et al. |
| 5,351,438 A | 10/1994 | Wolverton et al. |
| D352,478 S | 11/1994 | Whittle et al. |
| 5,394,647 A | 3/1995 | Blackford, Jr. |
| 5,397,382 A | 3/1995 | Anderson |
| D357,644 S | 4/1995 | Pedersen |
| 5,407,470 A | 4/1995 | Jutzi |
| D360,603 S | 7/1995 | Harman |
| 5,433,923 A | 7/1995 | Wolverton et al. |
| 5,440,836 A | 8/1995 | Lee |
| 5,501,037 A | 3/1996 | Aldokimov et al. |
| 5,533,302 A | 7/1996 | Lynch et al. |
| 5,724,768 A | 3/1998 | Amman, Jr. |
| 5,887,383 A | 3/1999 | Soeda |
| 5,918,416 A | 7/1999 | Ammann, Jr. |
| 5,937,575 A | 8/1999 | Zobel et al. |
| 6,000,173 A | 12/1999 | Schow et al. |
| 6,021,602 A | 2/2000 | Orsi |
| 6,105,309 A | 8/2000 | Takayanagi |
| 6,230,437 B1 | 5/2001 | Wolverton et al. |
| 6,293,048 B1 | 9/2001 | Boulter et al. |
| 6,477,805 B2 | 11/2002 | Ware |
| 6,499,249 B1 | 12/2002 | Luijkx |
| 6,615,542 B2 | 9/2003 | Ware |
| 6,634,138 B2 | 10/2003 | Katzman |
| 6,727,091 B2 | 4/2004 | Darlington |
| 6,840,008 B1 | 1/2005 | Bullock et al. |
| 7,055,282 B2 | 6/2006 | Bryan, III |
| 7,243,460 B2 | 7/2007 | Darlington |
| D586,688 S | 2/2009 | Bromley et al. |
| 7,516,574 B2 | 4/2009 | Gottlieb et al. |
| D606,773 S | 12/2009 | Copp et al. |
| 7,757,436 B2 | 7/2010 | Bindschedler et al. |
| 7,823,328 B2 | 11/2010 | Walhovd |
| 7,877,927 B2 | 2/2011 | Roy et al. |
| D638,743 S | 5/2011 | Bouchard et al. |
| 7,937,891 B2 | 5/2011 | Benfey et al. |
| D644,560 S | 9/2011 | Hashimoto |
| D646,193 S | 10/2011 | Hashimoto |
| 8,083,835 B2 | 12/2011 | Mittelmark et al. |
| 8,136,296 B2 | 3/2012 | Hogan |
| 8,181,391 B1 | 5/2012 | Giacomantonio |
| 8,225,549 B2 | 7/2012 | Simmons |
| 8,250,804 B2 * | 8/2012 | Chang ............... A01G 9/025 47/39 |
| 8,250,809 B2 | 8/2012 | Simmons |
| 8,312,673 B2 | 11/2012 | Benfey et al. |
| 8,365,466 B1 | 2/2013 | Storey |
| 8,454,729 B2 | 6/2013 | Mittelmark et al. |
| 8,505,238 B2 | 8/2013 | Luebbers et al. |
| 8,516,742 B1 | 8/2013 | Azoulay |
| 8,549,788 B2 | 10/2013 | Bryan, III |
| 8,621,782 B2 | 1/2014 | Buck et al. |
| 8,667,734 B2 | 3/2014 | Johnson et al. |
| 8,707,619 B2 | 4/2014 | Edwards et al. |
| D705,564 S | 5/2014 | Probst et al. |
| 8,726,568 B2 | 5/2014 | Wilson et al. |
| 8,869,447 B2 | 10/2014 | Benfey et al. |
| 8,881,454 B2 | 11/2014 | Janney |
| 8,894,741 B2 | 11/2014 | Mittelmark |
| 8,904,705 B2 | 12/2014 | Down, Sr. |
| 8,915,016 B2 | 12/2014 | Wilson et al. |
| 8,950,111 B2 | 2/2015 | Soejima |
| 8,966,819 B1 | 3/2015 | Cosmann |
| 9,010,019 B2 | 4/2015 | Mittelmark |
| D729,115 S | 5/2015 | Prinster et al. |
| 9,101,099 B2 | 8/2015 | Nagels et al. |
| 9,125,351 B2 | 9/2015 | Wu et al. |
| D741,216 S | 10/2015 | Peterson et al. |
| 9,210,846 B2 | 12/2015 | Vanlente |
| 9,220,207 B2 | 12/2015 | Storey |
| 9,226,457 B2 | 1/2016 | Laurence et al. |
| 9,258,948 B2 | 2/2016 | Dos Santos |
| 9,258,953 B2 | 2/2016 | Wilson et al. |
| D752,478 S | 3/2016 | Cudmore et al. |
| 9,277,696 B2 | 3/2016 | Wilson et al. |
| 9,288,951 B2 | 3/2016 | Hansen et al. |
| 9,345,207 B2 | 5/2016 | Juncal et al. |
| 9,357,715 B2 | 6/2016 | Cottrell |
| 9,374,951 B2 | 6/2016 | Church et al. |
| D760,622 S | 7/2016 | Ogden |
| 2001/0047617 A1 | 12/2001 | Blossom |
| 2003/0213170 A1 | 11/2003 | Snead et al. |
| 2003/0217507 A1 | 11/2003 | Wolverton et al. |
| 2004/0063194 A1 | 4/2004 | Darlington et al. |
| 2006/0168882 A1 | 8/2006 | Hashimoto et al. |
| 2007/0113472 A1 | 5/2007 | Plowman |
| 2007/0199241 A1 | 8/2007 | Peleszezak |
| 2009/0000189 A1 | 1/2009 | Black |
| 2009/0223126 A1 | 9/2009 | Garner et al. |
| 2009/0293357 A1 | 12/2009 | Vickers et al. |
| 2009/0313894 A1 | 12/2009 | Bieber |
| 2010/0037517 A1 | 2/2010 | Copping et al. |
| 2010/0139160 A1 | 6/2010 | Hirsh et al. |
| 2010/0146855 A1 | 6/2010 | Ma |
| 2011/0225883 A1 | 9/2011 | Clifford |
| 2011/0258925 A1 | 10/2011 | Baker |
| 2012/0066972 A1 | 3/2012 | Lin |
| 2012/0311926 A1 | 12/2012 | Mittelmark |
| 2013/0118070 A1 | 5/2013 | Marquez |
| 2013/0145690 A1 | 6/2013 | Cannon |
| 2013/0340337 A1 | 12/2013 | Kuo et al. |
| 2014/0000162 A1 | 1/2014 | Blank |
| 2014/0000163 A1 | 1/2014 | Lin |
| 2014/0190078 A1 | 7/2014 | Kim |
| 2014/0283450 A1 | 9/2014 | Darlington |
| 2015/0223418 A1 | 8/2015 | Collins et al. |
| 2015/0296724 A1 | 10/2015 | Martinez Ruanova |
| 2015/0319947 A1 | 11/2015 | Smith |
| 2015/0334930 A1 | 11/2015 | Stoltzfus et al. |
| 2016/0029580 A1 | 2/2016 | Sakai et al. |
| 2016/0037738 A1 | 2/2016 | Kato et al. |
| 2016/0044879 A1 | 2/2016 | Hamlin |
| 2016/0066525 A1 | 3/2016 | Duquesnay et al. |
| 2016/0128288 A1 | 5/2016 | Pettinelli |
| 2016/0135393 A1 | 5/2016 | Martinez Ruanova |
| 2016/0135394 A1 | 5/2016 | Wagner |
| 2016/0183488 A1 | 6/2016 | Yano et al. |
| 2016/0198652 A1 | 7/2016 | Yano et al. |

FOREIGN PATENT DOCUMENTS

| | | | |
|---|---|---|---|
| CN | 101472465 A | 7/2009 | |
| CN | 201378969 Y | 1/2010 | |
| CN | 101647386 A | 2/2010 | |
| CN | 201624046 U | 11/2010 | |
| EP | 0393408 B1 | 2/1994 | |
| EP | 1367334 A1 | 12/2003 | |
| EP | 1519121 B1 | 3/2007 | |
| EP | 1771062 B1 | 1/2008 | |
| EP | 1773108 B1 | 7/2008 | |
| EP | 1679951 B1 | 1/2009 | |
| EP | 2193708 B1 | 8/2011 | |
| EP | 2322031 B1 | 12/2012 | |
| EP | 2323473 B1 | 4/2013 | |
| EP | 2465107 B1 | 5/2013 | |
| EP | 2644025 A1 | 10/2013 | |
| EP | 2481279 B1 | 11/2013 | |
| EP | 2493282 B1 | 4/2014 | |
| EP | 2845466 A1 | 3/2015 | |
| GB | 2297087 A * | 7/1996 | ............... A61L 9/12 |
| GB | 2297087 B | 1/1999 | |

(56) References Cited

FOREIGN PATENT DOCUMENTS

| | | |
|---|---|---|
| GB | 2430856 A | 4/2007 |
| KR | 100771486 B1 | 9/2007 |
| WO | WO 2005025296 A1 | 3/2005 |
| WO | WO 2007101339 A1 | 9/2007 |
| WO | WO 2010025837 A1 | 3/2010 |
| WO | WO-2011057212 A2 * | 5/2011 ............ A01G 9/025 |
| WO | WO2013082847 A1 | 6/2013 |
| WO | WO2013128049 A1 | 9/2013 |
| WO | WO2013150255 A1 | 10/2013 |
| WO | WO2014102553 A1 | 7/2014 |
| WO | WO2014123722 A1 | 8/2014 |
| WO | WO2014179630 A2 | 11/2014 |
| WO | WO2016108031 A1 | 7/2016 |

* cited by examiner

APPARATUS FOR THE GROWING OF PLANTS AND A GROWING DEVICE

The present invention relates to an apparatus for the growing of plants, which includes
- a frame, to which plants can be set to grow in a substrate,
- irrigation means fitted to the frame, for irrigating the substrate with an irrigation liquid,
- means fitted to the frame for creating an airflow through the substrate.

In addition, the invention also relates to a growing device.

Various types of green wall, which traditionally are built, for example, on exterior walls, are known from the prior art. Often they are made to measure and their main function is to increase comfort and to look beautiful. In them, the plants grow in a traditional peat or soil substrate, or sometimes rarely also in hydroponics, for example, in hydro-gravel.

Green walls for interior use are also known, for example, from international patent-application publication number WO 2011/057212 A2 and GB patent-application publication number 2 297 087 A. In the latter, an airflow is created through the substrate, by means of which the interior air is purified. However, the integrated construction of the green wall makes it quite difficult to change the plants in it. For its part, the solution disclosed in the WO publication discloses the utilization in a green wall of elements to be attached to the surface of the frame of the green wall. However, it lacks an airflow through the substrate, nor would the implementation of this be very suitable to such a solution. In addition, it uses a special construction for draining the irrigation water, which makes the structure complicated and demands maintenance.

If peat or soil is used as the substrate in green walls, air-quality problems arise. Most of the allergens and mould spores arising from indoor plants are caused by precisely the aforesaid substrates. In addition, in traditional green walls it is also difficult to change the plants and this is not even to be recommended.

The invention is intended to create an apparatus for growing plants, which has a simple construction, is effective in operation, and also permits the easy changing of plants. In addition, the invention is also intended to create a growing device.

At least some of the plants, together with their substrates, are arranged in modular growing units, for which places are arranged in the frame, in which they can be detachably installed independently of the irrigation means. This makes it extremely simple to change the plants in the apparatus.

According to one embodiment of the device, the frame can include at least one wall structure, in which places are arranged for the growing units. In this case, of the growing units at least the foliage part of the plant can be arranged to fit into on one side of the wall structure while the irrigation of the substrate placed in the growing units can be arranged on the other side of the wall structure.

According to one embodiment, the wall structure is arranged to delimit the space formed by the frame, in which the irrigation of the substrate is arranged to take place. According to one embodiment, growing units can be fitted mostly inside the space, when the units are installed in the places arranged for them in the frame. This makes the irrigation of the substrate very simple, and this can take place inside the frame of the device, and thus does not require the device to have, for example, the special layered constructions known from the prior art.

According to one embodiment, the growing units are arranged to form, when fitted into the places, horizontal receptacles, which are separate from each other, and in which there is a chamber for the substrate. In the end of the growing unit remaining outside the frame of the apparatus, there is an upwardly facing opening for the plant. With the aid of the opening, the plant can grow upwards in a natural manner. For its part, the receptacle-like growing unit, set in place horizontally, permits the effective interaction of air and irrigation liquid and their passage through the substrate. Thus, the air is purified mainly in the entire volume of the substrate while, in addition, the roots of the plant are able to spread essentially evenly into the entire volume of the substrate.

The irrigation of the apparatus can be implemented extremely simply to operate automatically by gravity from one growing unit to another. Irrigation liquid can be brought to the device, for example to an upper growing position, where it can be distributed to the uppermost substrates. The liquid flows through the substrates from one layer to the next downwards from one unit to another, because the units are arranged on top of each other in the device. Perforation in the growing units allows excess liquid to exit from one unit and to flow freely to the next unit below.

According to one embodiment, the growing units are arranged to be formed of receptacles, in which there is a chamber open essentially upwards for the substrate and which are fitted horizontally into their places. One example of a receptacle is a cylinder. The cylindrical shape of the growing units permits liquid to flow surely under its own weight to a lower growing unit, without requiring special irrigation-liquid guiding or conducting structures between the units. Thus, the internal spaces of the apparatus can be mainly empty of structures, making the technical implementation of the device very simple.

In the apparatus and the growing device, there is a large surface area binding the chemicals or similar of the substrate while, in addition, air circulation through the substrate and the irrigation of the substrate take place efficiently. This is because the air and liquid can exit from the unit in several directions, due to its shape and the perforation in it. Thus, the air travelling through the unit can interact with essentially all of the porous substrate material, because the air can exit from the unit in several directions. Besides the changeability of the plants, the scalability of the device is also good.

The device can have several different applications. A first application of the device is its use as a vegetable-based bio-filter, for example to remove air-carried volatile organic compounds and microbes. A second application of the device is to promote the growth of plants, either in addition to air purification or even without it. Yet a third application is water purification, which allows dirty water to be used for irrigation. Other additional advantages of the invention appear in the description portion and its specific features in the accompanying Claims.

Figure 2:
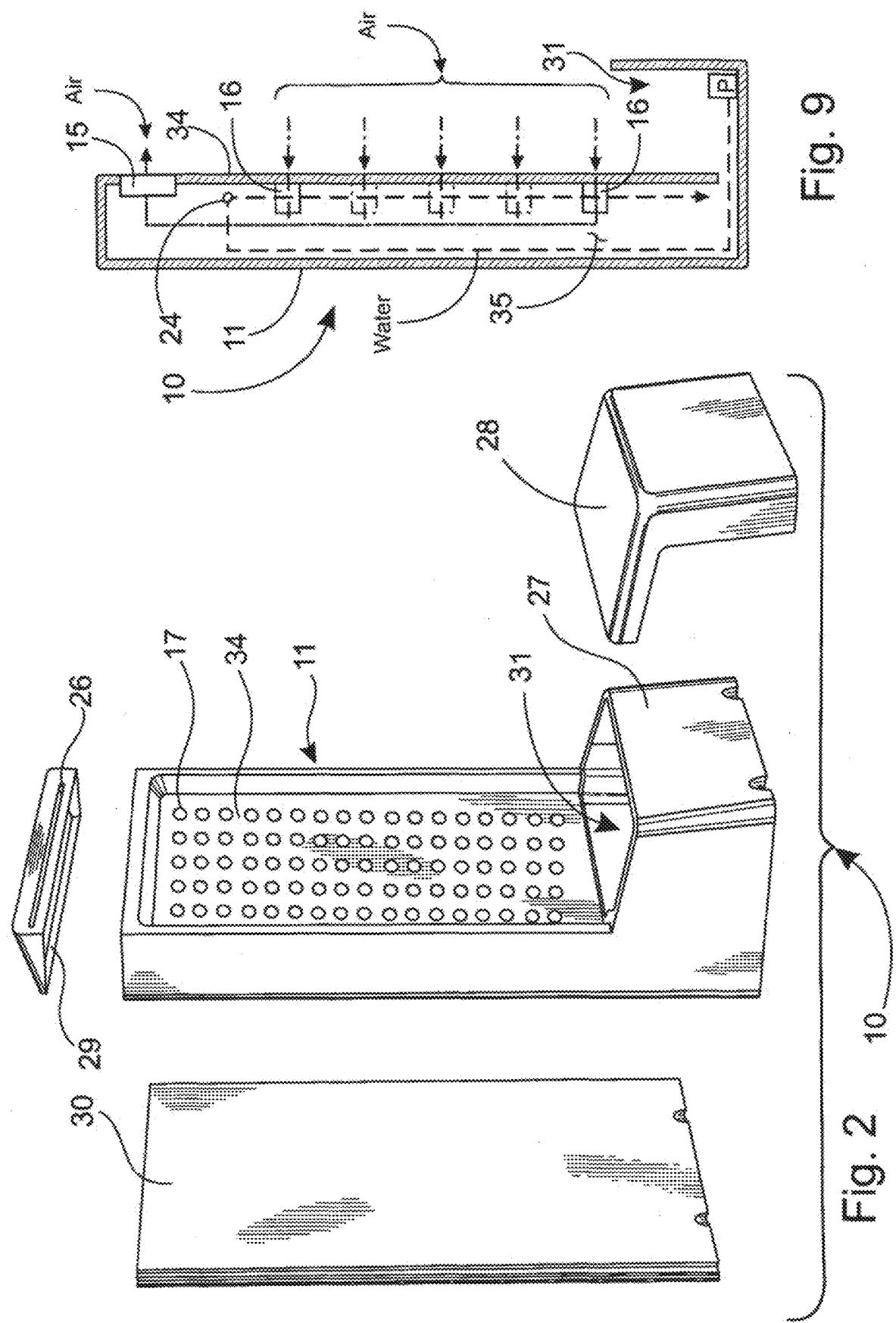
Figure 3:
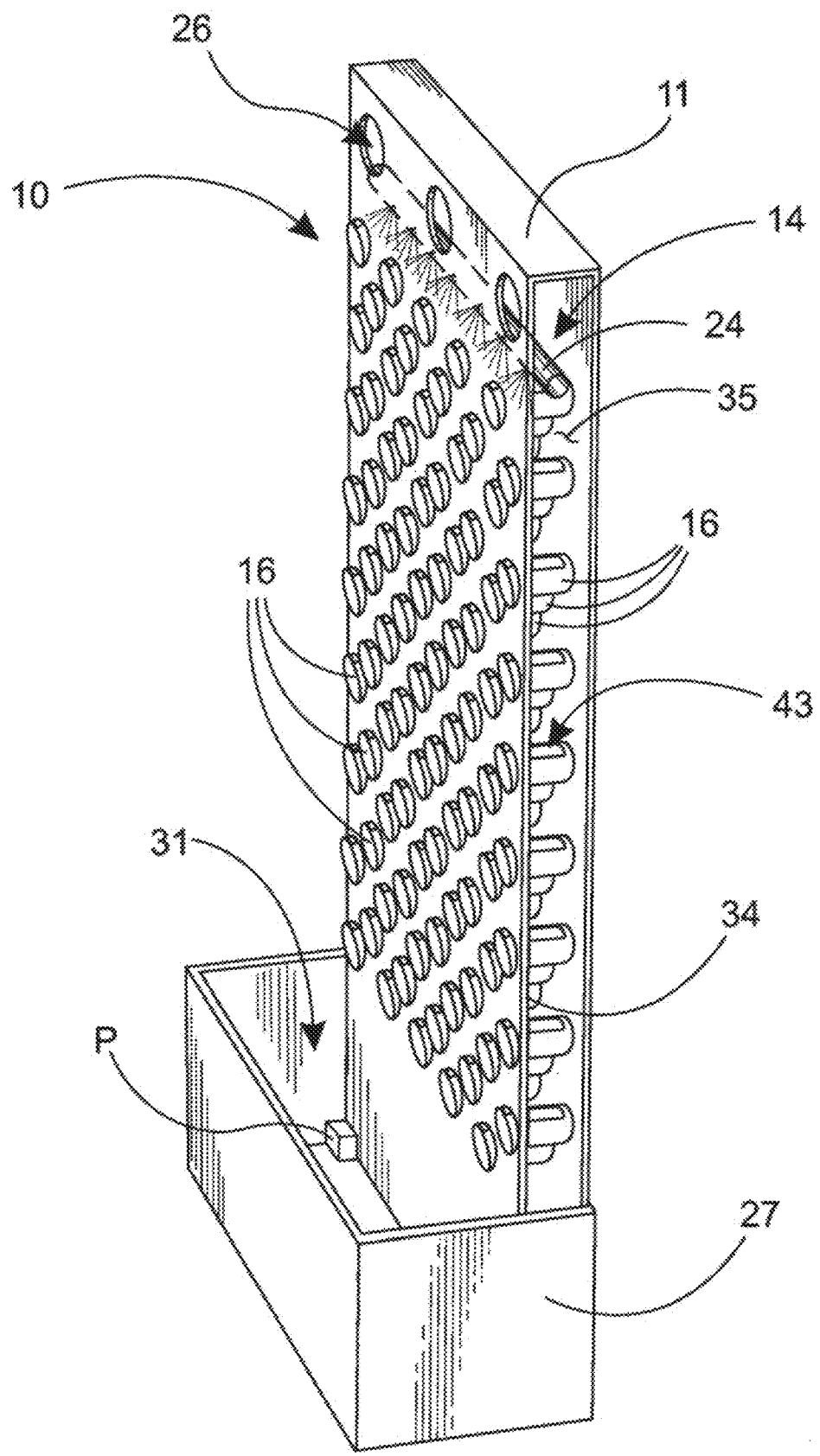
Figure 4:
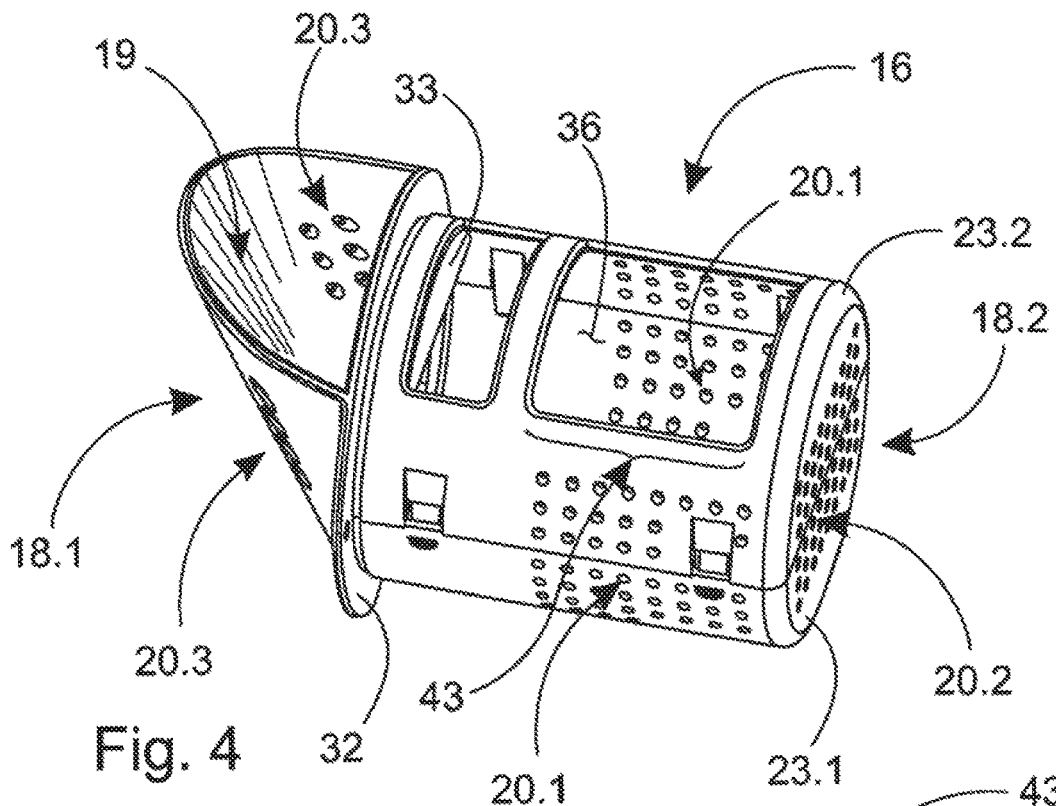
Figure 8:
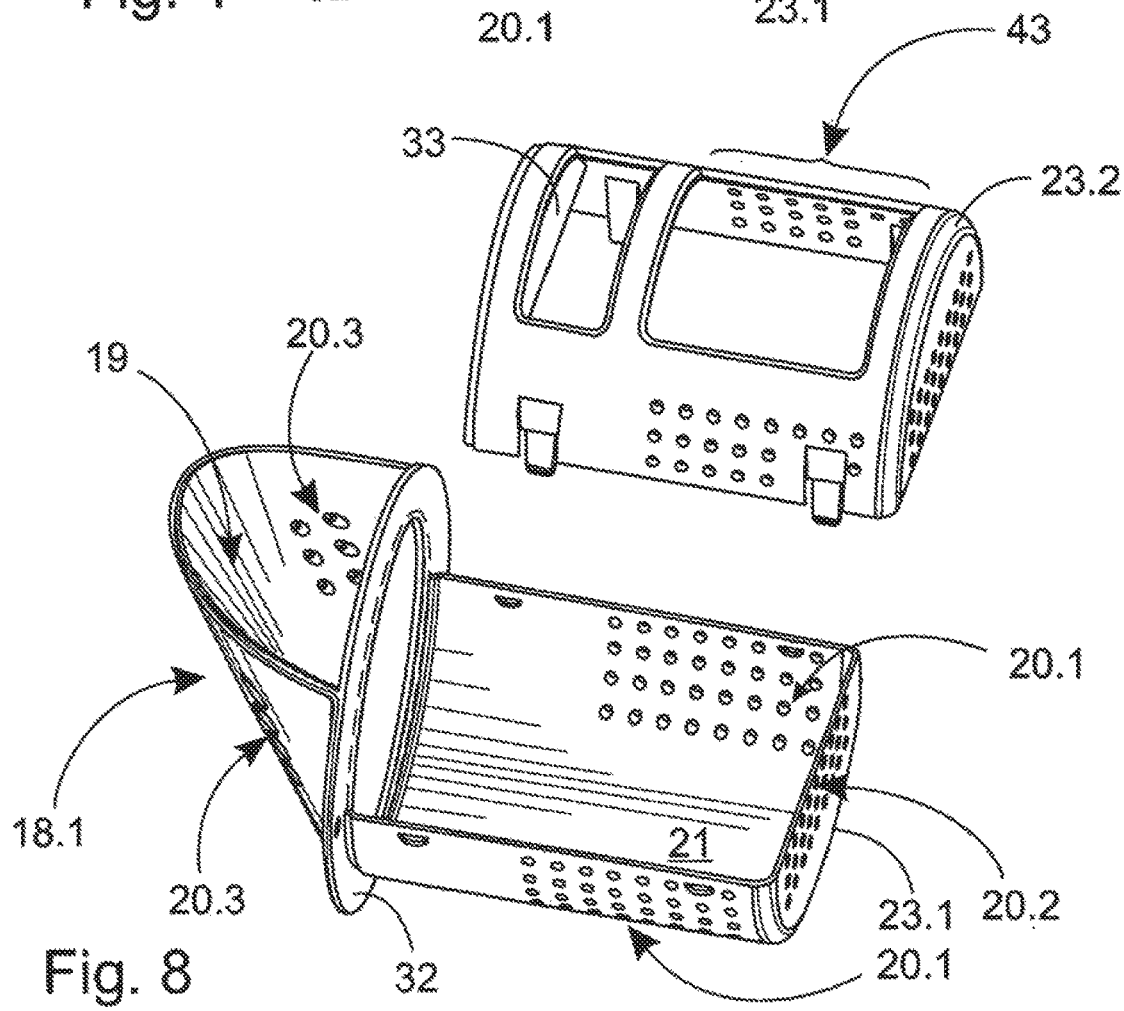
Figure 5:
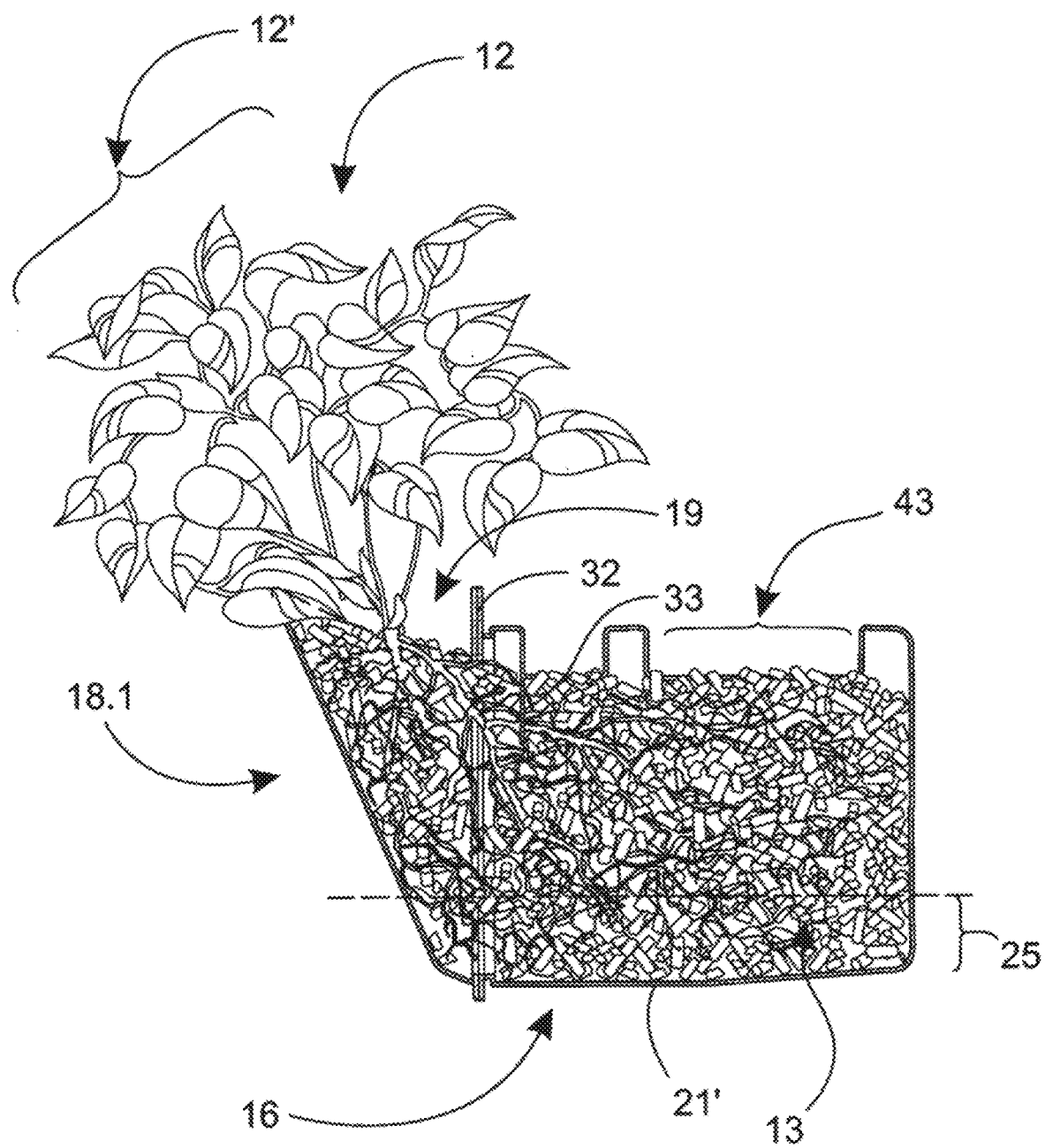
Figure 6:
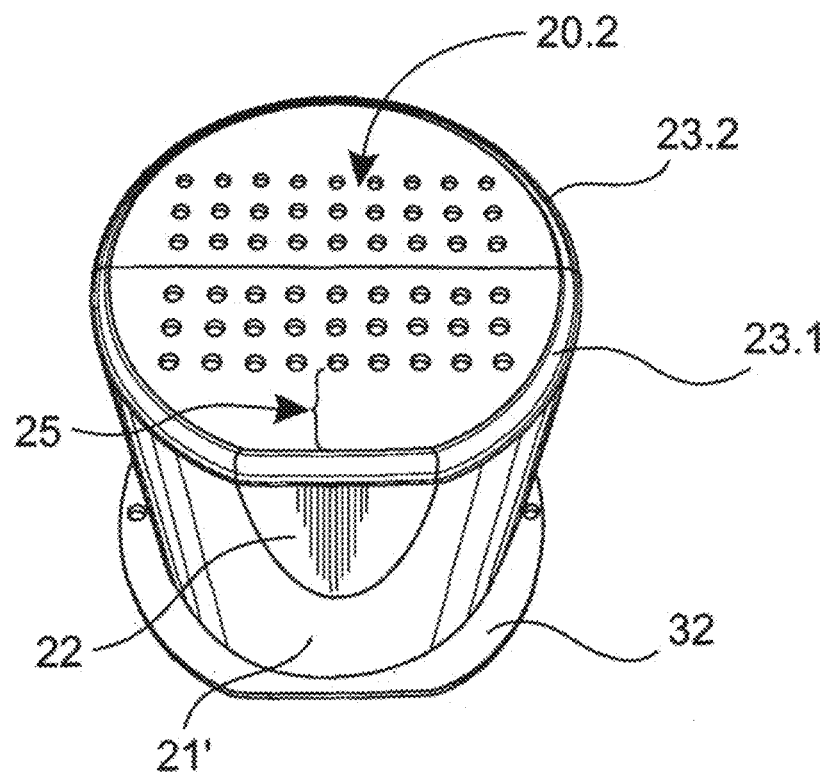
Figure 7:
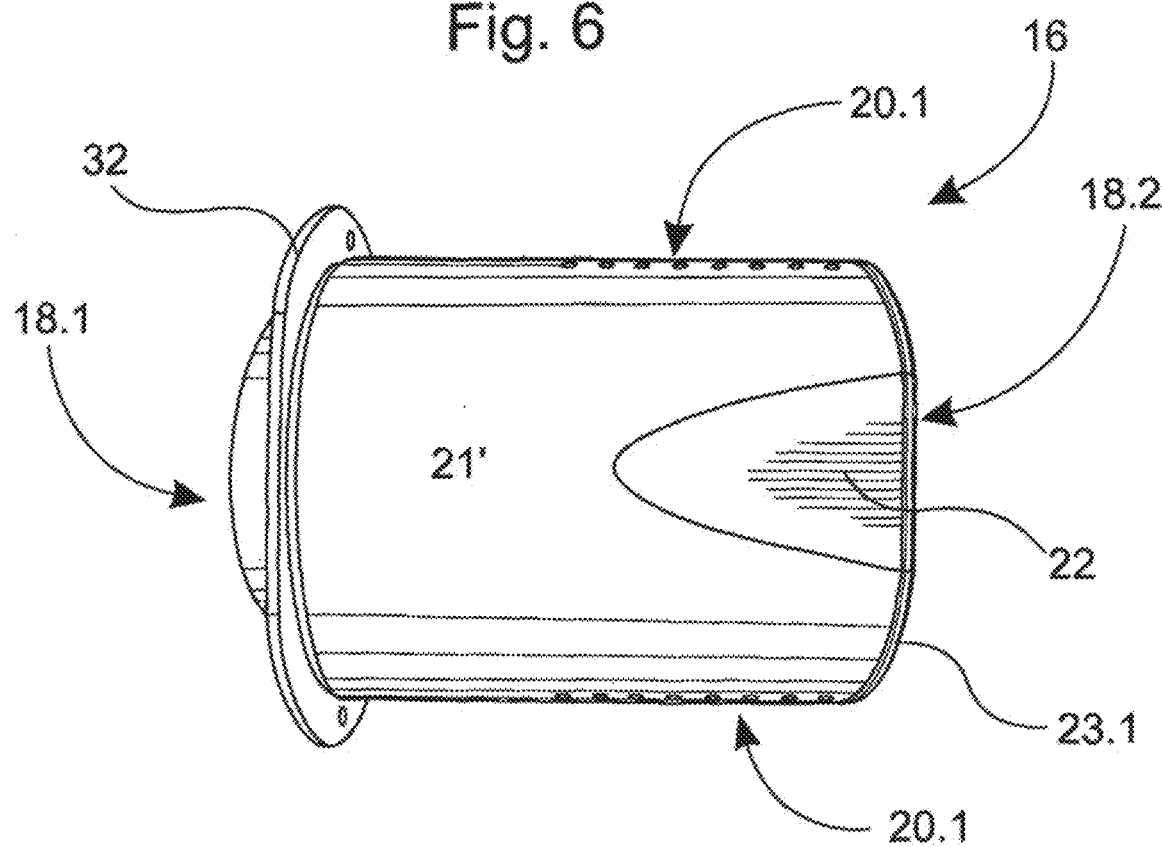

The invention, which is not restricted to the embodiment presented in the following, is described in greater detail with reference to the accompanying drawings, in which FIG. 1 shows an end view seen from an angle of one example of the apparatus, FIG. 2 shows an exploded view of one example of the frame of the apparatus, FIG. 3 shows the apparatus according to FIG. 1 with the side wall removed and without plants, FIG. 4 shows a top view seen from an angle of one example of the growing unit, FIG. 5 shows a cross-section of the growing unit with plants and substrate, FIGS. 6 and 7 show a bottom view of the growing unit, FIG. 8 shows the growing unit dismantled into components, and FIG. 9 shows a schematic cross-section of the operation of the apparatus.

FIG. 1 shows, on a schematic level, one example of the apparatus 10 for growing plants 12, seen at an angle from in front. In connection with the invention, growing can be understood broadly. It can, for example, be the growing of the mass of the parts of the plants 12, such as the foliage and/or root system, or also only maintaining them, without a substantial increase in their mass. One example of an application of the apparatus 10 can be air purification, which is described in the following with reference to the apparatus 10. The basic components of the apparatus 10 include a frame 11, plants 12 set in the frame 11 together with air-purifying substrates 13 (FIG. 5), substrate-irrigation means 14 (FIG. 3), and means 15 for creating an airflow through the substrate 13 and the frame 11.

FIG. 2 shows an exploded view of the frame 11 of one apparatus 10. The apparatus 10 itself, once assembled, is not intended to be opened. In this case, the frame 11 is a vertical, independently-standing structure, in the lower part of which is a trough 27 also acting as a pedestal. The trough 27 forms a tank-shaped reserve 31 for the irrigation liquid. The trough 27 can be covered by means of a cover component 28. In the front wall 34 of the frame 11 there are discrete openings 17, into which can be fitted growing units (reference number 16 in FIG. 3), which are described in greater detail somewhat later in this description. Thus, the frame 11 includes at least one wall structure 34, in which places 17 are arranged for the growing units 16. In this case, the openings 17 are in a matrix-like arrangement, but other ways of arranging them in the front wall 34 are also possible.

In the upper part of the frame 11 there is a cover 29, in which there is an opening 26 for arranging air circulation. The rear part of the frame 11 can be closed by means of a wall element 30. Inside the assembled frame 11, between the cover 29, the front wall 34, the rear wall 30, and the closed lower part of the frame 11 a space 35 (FIGS. 3 and 9) is delimited, from which there is an air connection to outside the frame 11 only through the opening 26 in the cover 29 and the openings 17 of the front wall 34. The space 35 can be empty and mainly without any structures. Otherwise, the internal hollow space 35 of the box-like frame 11 is mainly airtight. Air circulation can be arranged between the openings 17 and 26 through the internal space 35 of the frame 11.

FIG. 3 shows the apparatus 10, according to FIG. 1, for growing plants, with the side wall of the frame 11 removed, without plants and with plants 12 in the use situation of FIG. 1. The frame 11 of the apparatus 10 can be arranged to grow plants 12 in an air-purifying substrate 13, in which microbes grow for purifying the air. At least part of the substrate 13, together with the plants 12, is set in modular growing units 16, which in this connection can also be referred to as filter elements. In this embodiment, the growing units 16 installed in the places 17 arranged in the frame 11 are set mainly inside the space 35 formed by the frame 11, as shown in FIG. 3. This gives the apparatus 10 an appearance that is aesthetic, simplifies the implementation of the irrigation means, and also permits a greater volume of substrate 13 and thus more effective air purification.

Places 17 for the growing units 16 are arranged in the frame 11, in this case in its front wall 34, where they can be detachably installed, independently of the irrigation means 14. As the plants 12 grow in filter elements 16 separately from each other, they can if necessary even be changed. The modularity of the units 16 also facilitates the changing of the plants 12. In this connection, the term the modularity of the units 16 refers, for example, to a plug-and-play type of implementation. In it, the unit 16 can be pushed into its place, which can be an opening 17 made in the front wall 34, and correspondingly removed from the place by simply pulling the unit 16 out of the opening 17.

FIG. 3 also shows clearly one way to implement the irrigation means 14 arranged in the frame 11 of the apparatus 10 for irrigating the substrate 13 with irrigation liquid. In this embodiment, the irrigation means 14 include means P for transferring the irrigation liquid to the growing units 16. The means is now a pump P fitted to the tank 31. The pump P is connected by a pipe (not shown) to the means 24 arranged in the upper part of the frame 11 for distributing the irrigation liquid to the growing units 16 fitted to the upper part of the apparatus 10. The means can include at least one distributor pipe 24, in which there is perforation for distributing the liquid essentially evenly over the entire main width of the frame 11, in which the plants 12 are.

In the application, the apparatus 10 can consist of a one or two-sided plant wall of an appropriate size. In this case, the apparatus 10 is one-sided, the plants 12 being arranged on only the front wall 34. When two-sided, the depth of the apparatus 10 still remains relatively small, because the openings in the wall opposite to the front wall for the units 12 can be, for example, suitable staggered relative to the openings of the front wall 34. Similarly, the apparatus 10 can also be in the form of a pillar, in which case it can have three, four, or even more walls equipped with plants. Various different types of apparatus design are possible to one skilled in the art, the invention being in no way restricted to the one-wall 34 implementation described here.

Further, means 15 are also arranged in the frame 11 for creating an airflow through the substrate 13. The means for creating an airflow through the substrate 13 include at least one fan device 15 (FIG. 1), which is arranged in the openings 26 (FIG. 3) set in the upper part of the frame 11, and which is arranged, for example, to suck air through the growing units 16, and thus also the substrate 13, and into 35 the apparatus 10 and to then blow it out of the apparatus 10 from its upper part. In addition, lights can be arranged outside the apparatus 10 to provide the plants 12 with sufficient illumination and these can be attached to hang from the upper end of the apparatus 10 or from the ceiling (not shown).

Alternatively, the fans can also be arranged in an aesthetically acceptable manner inside the frame 11, in such a way that there is an airtight plate above the irrigation pipe 24, in which there are holes for the fans and the fans themselves blow directly upwards. This is shown by the apparatus design of FIG. 2. The fans 15 are then concealed inside the apparatus 10 and the thin air exhaust opening 26 will appear acceptable from outside. The fans 15 can be, for example, fan devices for some electronic device, which are, as is known, low in power consumption and silent.

FIG. 4 shows one example of a growing unit 16. In itself, the growing unit 16 also forms one subject of the invention, more generally together with the substrate for the apparatus 10. Correspondingly, FIG. 5 shows a cross-section of a growing unit 16 with a plant 12 planted in the substrate 13. Substrate 13 is arranged in the growing unit 16 and a plant 12 is arranged to grow in it. The growing unit is now a modular elongated receptacle, in which there is a chamber 36 for the material forming the substrate 13. In this embodiment, the receptacle is cylindrical, but can also equally be, for example, rectangular.

In the case according to the embodiment being described, when installed in the place 17 arranged in the frame 11 of the apparatus 10, most of the growing unit 16 fits inside the apparatus 10. It will then be in a horizontal position, as clearly seen from FIG. 3. In addition, it can be detachably installed in the frame 11 of the apparatus 10 independently of the irrigation means 14, i.e. without a structural connection to the irrigation means 14. This permits the easy installation of the growing unit 16 in the apparatus 10 and also its easy removal from the apparatus 10. The shape of the growing unit 16 as a cylindrical receptacle is advantageous in many ways, as will be explained slightly later. Of course, the shape and size of the units 16 can vary from that described here.

When fitted into the places 17 arranged for them in the frame 11, the growing units are arranged to be formed of a horizontal receptacle 16, which in this case is a cylinder. At one end 18.1 of the receptacle 16 is an opening 19 facing upwards, for the foliage part 12 of the plant 12. The upwards facing opening 19 provides the plant 12 with a natural way to grow. The end 18.1 of the receptacle 16, shaped in a curve, remains outside the frame 11 in front of its front wall 34, when the unit 16 is installed in the place 17 arranged in the front wall 34. The space in the curved end 18.1 is also filled with substrate material. Thus, at least the foliage part 12' of the plant 12 is arranged to fit from the growing unit 16 onto one side of the wall structure 34.

The rest of the unit 16 fits into the hollow space 35, formed by the frame 11 and delimited on one side by the wall structure 34, which is on the other side of the wall structure 34 relative to the foliage part 12'. Irrigation of the substrate 13 set in the growing units 16 can be arranged on the other side of this wall structure 34. Thus, the hollow space 35, which is formed like a box, is arranged to receive most of the chamber 36 arranged for the substrate 13 of the growing units 16, which for its part permits simple irrigation in this space 35.

Further, the growing units 16 also includes perforation 20.1-20.3 made in them, arranged to permit both the flow of air through the substrate 13 and the exit of the irrigation liquid from the growing unit 16. The perforation 20.1 can be in the jacket of the receptacle 16 on both sides of it, when the unit 16 is installed in its place 17. There can be more perforation 20.1 in the jacket of the unit 16 towards the rear end 18.2 of the unit 16, so that air flowing through it cannot escape from the unit 16 too early. In addition, there can be perforation 20.2 in the end 18.2 of the receptacle 16, which is inside the apparatus 10 and, in addition, the end 18.1 remaining outside the apparatus 10 can have its own perforation 20.3, from which, for example, air can be sucked into the unit 16 or removed from the unit 16.

The perforation 20.1-20.3 is arranged to retain a constant amount of irrigation liquid on the bottom 21 of the chamber 36 of the growing unit 16. Therefore, the perforation 20.1, 20.2 does not extend completely to the bottom 21 of the chamber 36 when it is installed in its place 17, but instead the perforation starts at a distance 25 (FIGS. 5 and 6) from the bottom 21 of the chamber 36. Thus, there can always be a small reserve of liquid on the bottom 21 of the receptacle 16.

By arranging the location of the perforation 20.1-20.3 suitably in the jacket of the receptacle 16, the growing conditions of the plant 12 can be regulated individually, even though the irrigation is the same for all the units 16 over the same period of time. By locating the perforation 20.1, 20.2 farther from the bottom 21 of the unit 16, the size of the liquid reserve in the unit 16 can be affected. This makes it possible to grow very different types of plant in the same apparatus 10. The upper part 43 of the chamber 36 of the growing unit 16 is mainly open, in order to conduct irrigation liquid to the growing unit 16.

FIGS. 6 and 7 show bottom views of the growing unit 16 seen from different directions. According to one embodiment, when the growing unit 16 is installed in its place 17, there can be shaping 22 in the undersurface 21' of its bottom 21. The shaping is now a planar cut 22 made in the jacket surface of the receptacle 16, at its rear end 18.2, which will hold the unit 16 in the desired position on a planar surface, when, for example, changing the plants 12 in it, or during transportation. There can also be shaping (not shown) in the undersurface 21' of the bottom 21 of the receptacle 16 in order to collect irrigation liquid that has overflowed from the perforation 20.1, 20.1 and to drain it in a controlled manner into the growing unit 16 underneath.

FIG. 8 shows the growing unit 16 dismantled into components. In this case, the growing unit 16 is formed from two pieces 23.1, 23.2, which can be detachably attached to each other. The material of the growing units 16 can be, for example, food grade plastic.

As can be seen from FIGS. 4-8, the units 16 can include a collar 32 or similar seal (for example an O-ring) to attach them tightly to the place 17 arranged in the front wall 34 of the frame 11 of the apparatus 10. The collar 32 or sealing structure is fitted to the unit 16, for example, in such a way that 30-95% of the axial length of the unit extends inside the frame 11 of the apparatus 10, i.e. on that side of the front wall 34, in which there is the chamber 35 delimited by it. The collar 32 in the unit 16 remains outside the front wall 34 of the frame 11 and from the collar 32 the units 16 can be secured tightly to the front wall 34, for example using screws, if this is desired.

As can be seen from FIGS. 4 and 5, the growing unit 16 can include an intermediate wall structure 33 fitted to the front edge of the chamber 36, to ensure the passage of air through the substrate 13. The lip structure 33 fitted to the front edge of the chamber 36 prevents the air sucked into the unit 16 from escaping immediately into the apparatus 10 and not having the desired purification effect. In addition, if the substrate 13 subsides, thus forming a gap in the upper part of the chamber 36, the intermediate wall 33 nevertheless forces the air to circulate through the substrate 13.

In the case according to the embodiment, the substrate 13, which thus also acts as an air filter, can be mainly of an inorganic granular material, or a mixture of such. It can contain, for example, activated carbon, Leca pebbles, Perlite, or a similar inert porous and granular material. The use of a granular material achieves a large reaction surface area for effective air purification and a high porosity. In addition, the granular and porous substrate 13 maximizes the growth surface area of microbic growths. The circulation of air through the porous substrate 13 requires only a little energy. The granular material is also advantageous in the sense that the plants will not then form a dense ball of roots, as happens, for example, with peat and soil substrates. The granular porous material also permits over-watering of the substrate 13, without damaging the plant 12. Thanks to the unit 16 and the substrate 13, ideal air-water ratios are obtained for the plants 12, even with heavy over-watering. Due to this, the roots of the plants 12 receive oxygen unrestrictedly in over-watering, so that the roots of the plant 12 do not begin to rot, as would happen if the substrate were to be soil, in which air cannot circulate when water blocks all the pores. In this connection, the term over-watering refers to the fact that the plant 12 is irrigated more than the plant 12 can absorb into itself. Because the substrate material scarcely retains water, as soil does for example, but instead always takes in the same amount of water by capillary action to the substrate 13, the plant 12 has continuously optimal growing conditions. In this case, the term a substrate material that retains water poorly refers to a substrate 13, the retention percentage of which, i.e. the ratio of water flowing through the material to the water remaining in it, can be 1-30%, more particularly 1-15%, and quite particularly 5-12%. In addition, by changing the constituent materials of the substrate 13 and their ratios, optimal conditions can be ensured for even very different types of plant.

FIG. 9 shows a cross-section of the schematic operation of the apparatus 10, seen from the side of the apparatus 10 and especially its liquid and air circulations. Air to be purified is filtered through the filter elements formed by the modular units 16 and the plants 12 and substrate 13 placed in them. The plants 12 grow in the units 16. In the units 16, there is also the porous substrate material 13 required by the roots of the plants 12 and the filtering organisms. The irrigation of the substrate 13 and the subsequent leading of the water away from the substrate 13 maintains the filtering ability of the unit 16. Thus, the apparatus 10 forms a bio-filter, in which the leaves of the living plants 12 and the microbes of the root system decompose, for example, volatile organic compounds (VOC) and in which the air is filtered through the porous material acting as the substrate 13 of the plants 12.

In the receptacle 31, there is a pump P, which pumps liquid along a pipe to the upper part of the apparatus 10. The liquid can be, for example, water, in which nutrients are dissolved. There, the liquid is led at a suitable pressure (for example 0.5 bar) out of the suitably-dimensioned holes in the pipe 24, to the substrates 13 of the plants 12 that are uppermost in the front wall 34, and to the rear surface of the front wall 34, from where it flows along the wall 34 to the lower units 16. Thus, the blockage problems characterizing drip irrigation, for example, do not appear in the holes of the distributor pipe 24.

The substrate 13 can be guaranteed suitable moisture by operating the pump P according to a preset program. Irrigation can also be taken care of by using smart control electronics, which for example compare the air humidity of the apparatus 10 on the inside and the outside of the apparatus 10. From the difference between them, the irrigation need of the apparatus 10 can be determined very precisely, even though the conditions, for example the air temperature and humidity might vary significantly at the location of the apparatus 10.

From the uppermost row of units, the irrigation liquid flows in turn downwards evenly to each filter unit 16 from row to row. Thus, the growing units 16 are fitted into the frame 11 in such a way that the irrigation liquid is arranged to flow freely from one growing unit 16 to the next. Excess liquid flows back to the reservoir 31 in the lower part of the apparatus 10, from where it is recycled again to the plants through the upper part of the apparatus 10.

When the liquid chamber 25 in the bottom 21 of the unit 16 is full of liquid, the excess liquid can flow out of the unit 16 from the perforation 20.1, 20.2 in the jacket of the chamber 36 and rear end 18.2 of the receptacle and to then flow along the outer surface of the receptacle 16 to the underside 21' of the bottom 21 of the unit 16, from where it then drips in a controlled manner to the unit 16 in the corresponding lower position. Liquid that has collected on the lower surface 21' of the bottom 21 of the unit 16 drips by gravity downwards over the entire length of the unit 16, when it reaches the next unit 16 underneath and enters through the opening 43 in the upper part of the unit 16 to again irrigate the substrate 13 of this lower unit 16. Thus, the units 16 are set above one another in the vertical direction in the front wall 34 of the apparatus 10. Due to the overwatering and the relatively great porosity of the substrate 13, the substrate 13 remains always suitably moist, which ensures suitable conditions for the roots of the plant 12 and air-purifying organisms. In addition, due to this kind of self-acting irrigation, there is no need to arrange special liquid-distribution means in the frame 11 to distribute the irrigation liquid to the lower units, the same thing being taken care of instead by means of the unit 16 itself. This makes the apparatus 10 practically maintenance-free.

The fans 15 of the apparatus 10 correspondingly draw air into the filter-unit modules 16 from outside the apparatus 10, through the perforation 20.3 in the end 18.1 of the unit 16. The air is purified with the aid of the organisms in the substrate 13. Air leaves the substrate 13 through the opening 43 arranged in the unit 16 and the holes 20.1, 20.2 inside the apparatus 10. Further, the fans 15 blow purified air from the upper part of the apparatus back into the room. The air circulation can also be reversed, when air is drawn from the upper or lower part of the apparatus 10 and blown back into the room air through the filter-unit modules 16. Thus, the means 15 for creating an airflow through the substrate 13 can be arranged in two flow directions. The fans 15 can operate principally continuously.

The direction of the air circulation can be used to influence the growing conditions of the plant 12, for example, the temperature and humidity level. If air is sucked into the apparatus 10 through the units 16 and thus also the substrate 13, and is blown out from there, the plants 12 will remain at room temperature and the exhaust air will be cool. If the airflow runs in the opposite direction, air coming through the substrate 13 of the plants 12 is cool and a cool and moist zone will be formed around the plants 12. The different conditions will be of help during the different stages of the plants 12.

The direction of the airflow also affects the blowing pressure. If air is drawn into the apparatus 10 through the units 16 and blown out of the apparatus 10 through the fans 15, the air will only exit from the locations of the fans 15 'under pressure', when the airflow will be stronger. If, on the other hand, the air is blown out of the apparatus 10 through the units 16, the same airflow will break up into many smaller airflows, in which cause there will be insufficient power to blow the air farther into the room in which the apparatus 10 is situated.

The humidity of the air inside the apparatus 10 depends, for example, on how much time has passed since the previous irrigation and how much water remains on the bottom 21 of the units 16. This means that, if the air humidity is kept low, the roots of the plants 12 will not be able to grow out of the unit 16 and block the structure, thanks to the 'air pruning' principle. If it is wished to implement aeroponic cultivation, the air humidity can be kept very high and the irrigation interval short, in which case the roots of the plants 12 will be able to grow out of the unit 16 and the plant 12 will be able to grow strongly. On the other hand, the idea of aeroponic cultivation is to provide the roots of the plant 12 with more air that normally available, to increase their growth and this idea is already implemented in the normal operation of the apparatus 10. This differs from traditional aeroponic growing methods in that the apparatus 10 uses significantly less energy than a traditional aeroponic system, which demands a great deal of energy in order to produce a very fine water mist.

The operation of the apparatus 10 as an air-purifying filter is based on, as such, existing knowledge, according to which plants are known to be able to purify air of large amounts of impurities, such as volatile organic compounds. This is based mainly on microbe growths acting in the root balls, which decompose the detrimental compounds into nutrients for themselves and in an aerobic process for the plants. Living organisms are known to remove and decompose VOC compounds. Detrimental compounds end up in the roots, either along with the airflow or else the plants' leaves move them through the plant's stem to the root ball.

Bacteria carry out most of the decomposition of the detrimental compounds, though some plants can by themselves decompose smaller amount of, for example, VOC compounds. Some research has shown plants to reduce the microbe content of air by more than 50%. In addition, it has also been observed that, if individual plants are grown in an active-carbon substrate, their purification ability improves more than twenty times. In addition, the microbe growth in the roots of the plant continuously purify the active carbon, so that the active carbon does not become blocked and need not be changed, as it must in traditional active-carbon filters.

In addition, research has often demonstrated the positive effects on health of the presence of plants, for example, the improvement of work efficiency and concentration, and a more positive attitude in the users of the room.

Measurement data, for example, pH, water level, water electrical conductivity, the moisture of the growing units 16, the temperature, images of the plants, timing data for irrigation and lighting, and the operating condition, can be collected from the apparatus 10. If necessary, the data can be read remotely over an internet connection and the operations of the apparatus 10 can also be remotely controlled.

The apparatus 10 can be used to purify room air, for example, in homes, offices, or work stations. The size of the growing unit 16 acting as the filter can vary to a very great extent. At their smallest, its width and height can be a few tens of centimetres, while there is no upper limit. The depth of the frame of the apparatus can vary, for example, from 5 to 30 cm, but it too is not limited to these dimensions. The depth of the entire apparatus including the water reservoir 27, can vary, for example, from 30 to 200 cm, without, however, being limited to these dimensions.

In the pilot stage, the apparatus 10 was tested in a location that had already been previously renovated twice due to problems with indoor air. In a long-term study, the apparatus 10 was able to remove nearly 100% of the VOC compounds and to reduce the microbe content of the indoor air by about 78%, when the results were compared before and after the installation of the apparatus 10.

In air-filtering operation, the operating costs of the apparatus 10 are low and its purification efficiency is good. The plants 12 promote the maintenance of the microbe growth of the substrate 13 and the volatile organic compounds, i.e. VOCs, are decomposed for the plants 12 into nutrients, carbon dioxide, and water. The filter units 16 are self-cleaning and retain their purification power for a long time. A nutrient solution suitable for the plants 12 is sufficient for the maintenance of the filter units 16, along with the addition of water and the supply of power to the pump P. In addition, the plants 12 can be easily changed and selected according to the air quality of the location, so that it is even possible to focus the purification power, if, for example, the VOC profile of the indoor air at the location is known. In addition, because the microbe growth eats VOC compounds, the microbe growth becomes increasingly selected during the operation of the apparatus 10 on the basis of the available compounds and becomes more refined. I.e., if there are nutrients for the microbe growth, then there are also more microbes.

Though the apparatus 10 is described above mainly as purifying only air, it can also be utilized in addition, or even instead to improve the growth of the plants, or even to purify water. In addition to air purification, the plants 12 can also include food plants. When purifying water-based chemicals, dirty water can be led into the irrigation receptacle 31.

Although the invention is depicted above in an embodiment in which the units 16 are mainly in a space 35 inside the apparatus 10, other embodiments, in which this is not the case, can also come into question. The axial rear part 36 of the units 16 can also extend outside the apparatus, i.e. in front of the front wall 34. This is achieved by moving the position of the collar 32 in the axial direction of the unit 16, and possibly also the perforation 20.1, towards the rear end 18.2 of the unit 16.

In such as embodiment, air can be sucked from elsewhere into the apparatus and then blown out of the apparatus through the units. The air will then not necessarily spread into the room so effectively, because the blowing pressure is significantly lower than in an embodiment with an opposite airflow, but in principle the same operation will be achieved.

On the other hand, in such an embodiment the air can be sucked through the units and into the apparatus, as was the case already in the embodiment described above. In this case, the flow loss is, however, significantly greater, because, if the units are mostly outside the apparatus and the substrate inside the apparatus has been minimized, it is not practical to perforate the units outside, instead they should be airtight, except for the opening arranged in the unit for the plant. The air must then travel for a longer distance in the substrate, which of course assists the purification result, but increases the flow resistance. Thus, by means of the embodiment described in detail above, advantages are achieved in the form of a lower flow resistance and also a more aesthetic appearance, compared to an embodiment, in which most of the substrates of the units are outside the apparatus.

It must be understood that the above description and the related figures are only intended to illustrate the present invention. The invention is thus in no way restricted to only the embodiments disclosed or stated in the Claims, but many different variations and adaptations of the invention, which are possible within the scope on the inventive idea defined in the accompanying Claims, will be obvious to one skilled in the art.

The invention claimed is:

1. An apparatus for the growing of plants, comprising:
a frame, to which plants can be set to grow in a substrate of a material that retains water poorly,
an irrigation means fitted to the frame for irrigating the substrate with an irrigation liquid, said irrigation means comprising a pump configured to pump liquid along a pipe to an upper part of the apparatus,
modular growing units, wherein at least some of the plants with their corresponding substrates may be placed in said modular growing units, and
places arranged in the frame for the modular growing units, into which said modular growing units can be detachably installed, independently of the irrigation means,
and wherein the frame comprises a space delimited by a cover, a front wall, a rear wall, and a closed lower part of the frame, and wherein the front wall comprises at least one airflow opening in the upper part having at least one fan device arranged within said at least one airflow opening, wherein the at least one fan device is configured to provide at least a first and a second air circulation inside said space, said first air circulation comprising air entering the delimited space through the places for the growing units and exiting via the at least one airflow opening, and said second air circulation comprising air entering through the at least one airflow opening and exiting via the places for the growing units, and wherein the substrate is of a material of which the retention percentage is 1%-30%, and wherein the growing units are fitted into the frame in such a way that the irrigation liquid is arranged to flow freely from one growing unit to another growing unit, and wherein excess liquid flows back to a reservoir in the lower part of the apparatus, from where it is recycled again to the plants through the upper part of the apparatus.

2. The apparatus according to claim 1, wherein the frame includes at least one wall structure, in which;

the places for the growing units are arranged, and wherein each growing unit comprises a first side and a second side, wherein the first side of the growing unit is configured to fit at least a foliage part of at least one plant, and wherein the second side of the growing unit is configured to fit the substrate arranged in the growing unit.

3. The apparatus according to claim 2, wherein the growing units fit mostly inside the space when installed in the places.

4. The apparatus according to claim 1, wherein each growing units is formed of at least one receptacle, in which there is a chamber for the substrate and, wherein the receptacles are configured to be oriented horizontally when the growing units are fitted into the places.

5. The apparatus according to claim 4, wherein the places are arranged to receive the chamber arranged for the substrate in each of the growing units.

6. The apparatus according to claim 1, wherein a upper parts of each growing unit is mainly open when installed in a respective one of the places within the frame in order to lead irrigation liquid into the growing unit.

7. The apparatus according to claim 1, wherein each growing unit includes a perforation arranged to permit the through-flow of air through the substrate and the exit of irrigation liquid from the growing unit.

8. The apparatus according to claim 7, characterized in that the perforation is arranged to retain a constant amount of irrigation liquid in a chamber of each growing unit.

9. The apparatus according to claim 1, wherein the substrate comprises an inorganic granular material.

10. The apparatus according to claim 1, wherein each of the growing units comprises, in a portion remaining outside the frame, an upwards facing opening for a plant.

11. The apparatus according to claim 1, wherein each growing unit includes a collar to fit said growing unit within tightly in a respective one of the places arranged in the frame.

12. The apparatus according to claim 1, wherein in each growing unit there is an intermediate structure fitted to a front edge of a chamber in order to ensure the passage of air through the substrate.

13. The apparatus according to claim 1, wherein the irrigation means include:

means for transferring the irrigation liquid to the growing units, and means fitted to an upper part of the frame for distributing the irrigation liquid to the growing units fitted in the upper part of the frame.

14. The apparatus according to claim 1, wherein the reservoir and the space are arranged so that the space is limited by the reservoir on at least one side of the space.

15. The apparatus according to claim 1, wherein the air circulates freely within the space.

\* \* \* \* \*